(12) United States Patent
Annett et al.

(10) Patent No.: US 6,789,013 B2
(45) Date of Patent: Sep. 7, 2004

(54) VEHICLE ACTIVITY TRACKING

(75) Inventors: David Allan Annett, Auckland (NZ);
David Alexander Swarbrick, Auckland (NZ)

(73) Assignee: Navman NZ Limited, Auckland (NZ)

( * ) Notice: Subject to any disclaimer, the term of this patent is extended or adjusted under 35 U.S.C. 154(b) by 0 days.

(21) Appl. No.: 10/105,195

(22) Filed: Mar. 26, 2002

(65) Prior Publication Data

US 2002/0156576 A1 Oct. 24, 2002

Related U.S. Application Data

(60) Provisional application No. 60/285,706, filed on Apr. 24, 2001.

(51) Int. Cl.[7] .................................................. H01Q 1/32
(52) U.S. Cl. ...................................... 701/213; 343/879
(58) Field of Search ................................. 701/213, 215; 342/74, 82, 89–90, 357.12, 359, 357.06–357.09, 385, 400, 406, 423, 430, 434, 436–437, 444–445, 463–465; 343/711–718, 853, 872–876, 893, 879

(56) References Cited

U.S. PATENT DOCUMENTS

| | | | | |
|---|---|---|---|---|
| 5,682,168 A | * | 10/1997 | James et al. ................. | 343/713 |
| 5,838,237 A | * | 11/1998 | Revell et al. ............. | 340/573.1 |
| 6,421,010 B1 | * | 7/2002 | Chadwick et al. .......... | 342/465 |

* cited by examiner

*Primary Examiner*—Thu V. Nguyen
(74) *Attorney, Agent, or Firm*—Jacobson Holman PLLC

(57) ABSTRACT

A unitary vehicle tracking device having a GPS receiver, a radio transmitter, which preferably is a mobile phone modem integrated within a single waterproof housing suitable for mounting on the top exterior of the vehicle. The housing is transparent to radio signals and the GPS and mobile phone antennas are mounted on a common board above the other components. Preferably the mobile phone antenna is of the halo type and is mounted above and in registration with the GPS antenna so as not to interfere with the field of view of the GPS antenna.

5 Claims, 1 Drawing Sheet

VEHICLE ACTIVITY TRACKING

This application claims the benefit of and priority from U.S. Provisional Application Ser. No. 60/285,706, filed Apr. 24, 2001.

FIELD OF INVENTION

This invention relates to a tracking device using GPS, preferably for use with vehicles although it would also be suitable for other moving objects.

BACKGROUND

The reduction in price of global position system (GPS) receivers and the improved position accuracy available from GPS since selective availability (SA) was removed in April 2000, has fostered the use of onboard GPS receivers to track the position of vehicles.

In some instances the vehicle position so determined is used by the vehicle operator or other equipment located in the vehicle. In other applications the vehicle position information is transmitted to a central control location in order to provide remote tracking of the vehicle for fleet management. Existing mobile radio systems, such as the mobile cellular telephone system, have been proposed to communicate the GPS position data from the vehicle to the central control station. A tracking system which uses a speech synthesiser interface between a GPS receiver and a cellular telephone is disclosed in U.S. Pat. No. 5,918,180. A direct connection between the GPS receiver and a radio transceiver using a modem is clearly to be preferred.

The desirability of an integrated antenna for both cellular and GPS use has been recognised. Allen Telecom provide such a vehicle mounted antenna under the trade mark Tele-Locator™.

In many applications, for example fleet vehicle position and activity tracking where there is no vehicle operator interface required, it is undesirable and inconvenient to incorporate GPS equipment and separate discrete cellular telephone equipment within the vehicle operator cab. It would be desirable to integrate not only the antennas, but all GPS equipment and radio transceiver equipment in a package adapted for exterior mounting on the vehicle.

SUMMARY OF INVENTION

It is an object of the present invention to provide onboard vehicle tracking apparatus which meets the above desiderata.

Accordingly in a first aspect the invention consists in a vehicle tracking apparatus comprising:
 a GPS receiver,
 a processor which receives and stores vehicle position data from said receiver,
 a radio transmitter activated by said processor and modulated with at least the vehicle position data stored by said processor,
 a GPS antenna and a radio antenna configured and juxtaposed such that physical and radio interference between said antennas is minimised,
 a waterproof housing adapted for mounting on the exterior of a vehicle in which all of the above components are mounted, and
 said apparatus requiring only an external source of power to operate.

In a second aspect the invention consists in a vehicle tracking apparatus comprising:
 a GPS receiver,
 a radio transmitter activated by said processor and modulated with at least the vehicle position data provided by said GPS receiver,
 a GPS antenna and a radio antenna configured and juxtaposed such that physical and radio interference between antennas is minimised, and
 a waterproof housing adapted for mounting on the exterior of a vehicle or other mobile object in which all of the above components are mounted.

The vehicle tracking apparatus of the present invention is contained in a low profile streamlined weatherproof enclosure or dome purpose-designed for mounting on an exterior surface of a vehicle such as the roof. The GPS receiver, a processor, and a radio transceiver (such as cellular telephone componentry) are all mounted within the enclosure. The apparatus is self-contained and requires only a dc supply from the vehicle to operate. However where vehicle activity other than vehicle position is to be monitored, connections need to be made to other transducers mounted in the vehicle, for example, the vehicle ignition circuit.

Vehicle activity data is captured and stored at regular intervals and this data is then communicated via a radio network to a computer at the monitoring station. Software in this computer provides plots of monitored vehicles and other activity for each vehicle such as ignition on/off times, speed, direction and distance travelled.

In the preferred embodiments of the invention the radio system used is one of the established cellphone networks and references hereafter will be confined to such networks.

DESCRIPTION OF THE PREFERRED EMBODIMENTS OF THE INVENTION

Figure 1:
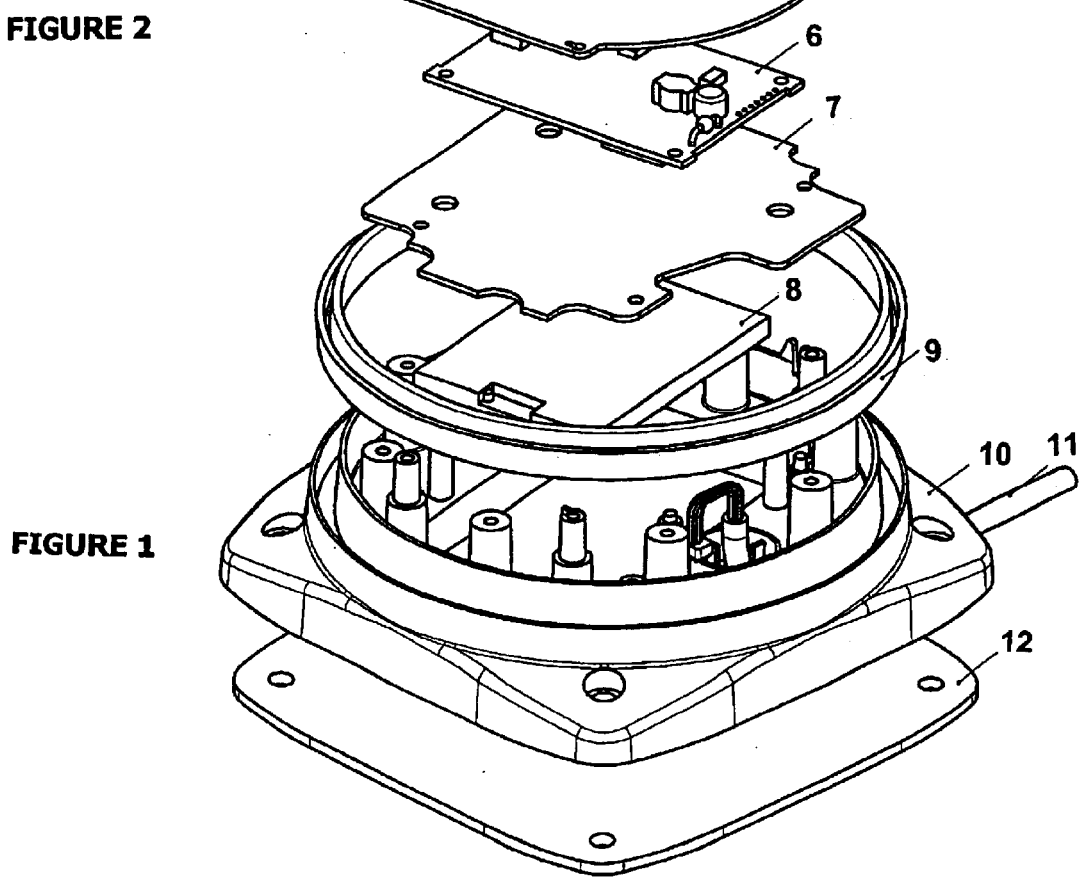
FIG. 1 shows an exploded view of vehicle position tracking apparatus of the present invention.

Referring to FIG. 1 a base 10 supports electronic modules and circuit board assemblies 5, 6, 7 and 8 within a dome 1 which peripherally mounts within a circumferential channel in the base 10. The joint is made watertight by the use of a flexible gasket 9.

Dome 1 is formed from suitable non-conductive, non-magnetic components. The shape of dome 1 is smooth and curved so it will not snag ropes used to secure loads on the vehicle. The whole assembly would normally be mounted on the roof of the vehicle with a seal 12 preventing water ingress to the interior. A connecting cable 11 for power and possibly other connections to devices in the vehicle may be fed straight through the roof or at a right angle, via a breakout in the base, across the roof.

Module 8 is a radio modem (comprising a radio transceiver or cellular modem operating at UHF or higher frequencies) which is attached to the underside of board 7, the interface board. The interface board comprises a wide input voltage range power supply, a microprocessor system and interface electronics for connection to the other boards and devices attached to the main cable 11. Module 6 is a GPS receiver which mounts on the topside of board 7.

The topside of board 5 provides physical supports for both a GPS patch antenna 4 and a radio modem halo antenna 2 as well as providing a ground plane for these antennas. It also provides the electrical connection point for the halo antenna.

Halo antenna 2 comprises a closed loop with one point of the halo being connected directly to the ground plane. The antenna is driven between ground and a tapped point on the circumference of the halo. The tap position is selected to provide the correct impedance match. The loop is also supported mechanically by an insulated connection 3. The underside of board 5 supports components not shown in FIG. 1, namely band pass filters and termination points for the coax cables to the GPS and radio modem modules. Dome 1 is formed from a non-conductive, non-magnetic material and thus does not effect the operation of either antenna.

An important aspect of the present invention is the type of radio modem antenna that is used. This antenna should fit within dome 1 while at the same time be able to operate without interference with the GPS antenna 4. In the preferred embodiment of the invention the antenna selected for the radio modem is the halo type already described. The halo antenna 2 at most frequencies used is low profile and thus easily contained within the dome envelope in contrast to the more usual vertical oriented whip antenna used at these frequencies.

Figure 2:
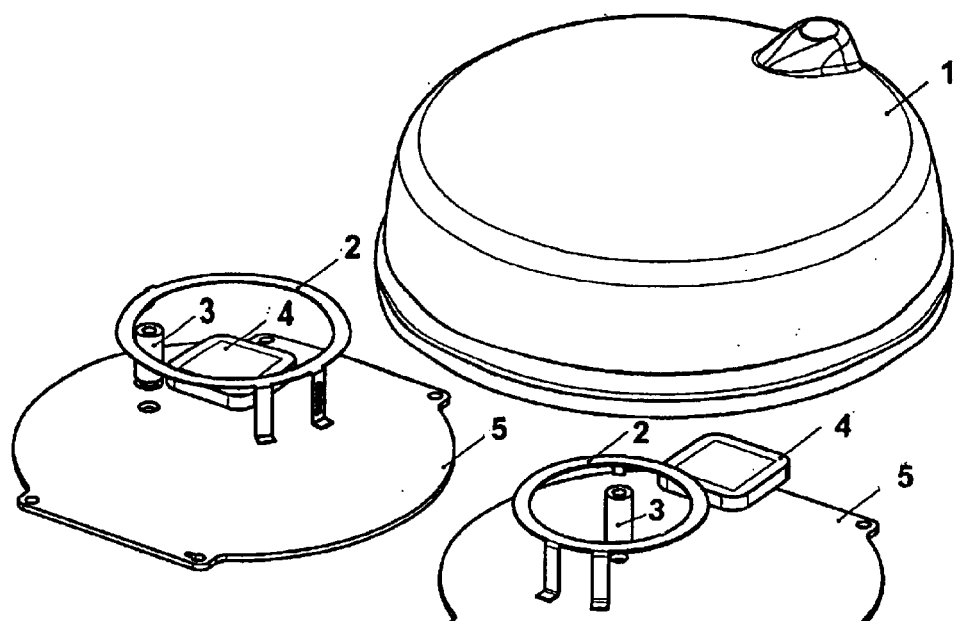
FIG. 2 shows an alternate configuration for the antennas on the apparatus antenna circuit board.

For the lower UHF bands, such as those used for AMPS and GSM900, the halo antenna 2 may be dimensioned and located in registration directly over the GPS patch antenna 4 without in any way obstructing that antenna which has a 'view' of the sky through the halo. This arrangement is shown in FIG. 2. For high bands, such as those used for GSM1800 and GSM1900, the halo loop is physically smaller and an alternative layout with the halo and patch antennas at opposite ends of board 5 may be employed as shown in FIG. 1.

The whole unit is connected to the vehicle and any auxiliary equipment by a single cable 11. This cable supplies either 12V or 24V to the power supply on the interface board 7. The power supply automatically handles the range of input voltages and generates a stable output for the microprocessor as well as supplies, switchable by the microprocessor, for the radio modem 8 and GPS receiver 6. By use of the switchable supplies and a selectable low frequency oscillator the microprocessor can reduce power consumption when the vehicle ignition is off, extending battery life.

In one embodiment of the invention the state of the vehicle ignition is monitored and used to determine when to save power and can be used to report, via radio modem, when the ignition is turned on and off. The microprocessor monitors the current location supplied by the GPS and will report this information in accordance with the users requirements which are set up via the radio modem. The microprocessor uses the radio modem to provide two way communications with a remote host computer. When the unit is out of radio coverage messages will be buffered until coverage is restored. The preferred radio modem is the type that provides a continuous cellular connection to the Internet such as CDPD, CDMA or GPRS. However any wireless module that operates on a frequency suited to the halo antenna may be used.

The microprocessor can also interface several external local devices via the single cable 11 using combinations of RS232, RS485 or general purpose automotive levels depending on build options. This allows for two way text messaging via a mobile data terminal such as the Talon MDT800 or a PDA of which the Palm Pilot is but one example.

In a further embodiment the vehicle tracking apparatus can contain its own power supply and be completely self contained. In this form it could be used with unpowered vehicles or other passive objects to be tracked.

In yet a further embodiment some or all of the functional modules on assemblies 5, 6, 7 and 8 may be fabricated as a single module and implemented on the lower side of board 5.

What is claimed is:

1. A vehicle tracking apparatus comprising:

a GPS receiver, a processor which receives and stores vehicle position data from said receiver, a radio transmitter activated by said processor and modulated with at least the vehicle position data stored by said processor, a GPS antenna and a halo antenna connected to said radio transmitter, configured and juxtaposed such that physical and radio interference between said antennas is minimised, and a waterproof housing adapted for mounting on the exterior of a vehicle in which the GPS receiver, the processor, the radio transmitter, the GPS antenna and the halo antenna are mounted, said apparatus requiring only an external source of power to operate.

2. The vehicle tracking apparatus according to claim 1, wherein said halo antenna is mounted over and in registration with said GPS antenna such that the GPS antenna view is not impeded by the halo antenna.

3. The vehicle tracking apparatus according to claim 1, further comprising a power source for said GPS receiver, said processor and said transmitter mounted within said housing.

4. A vehicle tracking apparatus comprising:

a GPS receiver, a radio transmitter activated by said processor and modulated with at least the vehicle position data provided by said GPS receiver, a GPS antenna and a halo antenna connected to said radio transmitter, configured and juxtaposed such that physical and radio interference between said antennas is minimised, and a waterproof housing adapted for mounting on the exterior of a vehicle or other mobile object in which the GPS receiver, the radio transmitter, the GPS antenna and the halo antenna are mounted.

5. The vehicle tracking apparatus according to claim 4, wherein said halo antenna is mounted over and in registration with said GPS antenna such that the GPS antenna view is not impeded by the halo antenna.

* * * * *